(12) United States Patent
Becker et al.

(10) Patent No.: US 8,299,749 B2
(45) Date of Patent: *Oct. 30, 2012

(54) CORDLESS POWER TOOL BATTERY AND CHARGING SYSTEM THEREFORE

(75) Inventors: Daniel Jay Becker, Monroe Township, NJ (US); William M. Ball, Jr., Stockton, NJ (US); Gil Holtzman, Harleysville, PA (US); Warren Andrew Seith, Bethlehem, PA (US)

(73) Assignee: Ingersoll Rand Company, Piscataway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/980,679

(22) Filed: Dec. 29, 2010

(65) Prior Publication Data

US 2011/0204848 A1    Aug. 25, 2011

Related U.S. Application Data

(63) Continuation of application No. 11/755,372, filed on May 30, 2007, now Pat. No. 7,863,857.

(60) Provisional application No. 60/809,955, filed on May 31, 2006.

(51) Int. Cl.
*H02J 7/00* (2006.01)
*H01M 2/10* (2006.01)

(52) U.S. Cl. ............ 320/106; 320/110; 320/125; 429/9; 429/99

(58) Field of Classification Search ............ 320/106
See application file for complete search history.

(56) References Cited

U.S. PATENT DOCUMENTS

| | | | |
|---|---|---|---|
| 5,144,217 A | 9/1992 | Gardner et al. | |
| 5,355,072 A | 10/1994 | Satsuma et al. | |
| 5,619,117 A | 4/1997 | Koenck | |
| 5,646,508 A | 7/1997 | van Phuoc et al. | |
| 5,656,917 A * | 8/1997 | Theobald | 320/106 |
| 6,075,341 A | 6/2000 | White et al. | |
| 6,124,698 A * | 9/2000 | Sakakibara | 320/110 |
| 6,181,103 B1 | 1/2001 | Chen | |
| 6,211,644 B1 * | 4/2001 | Wendelrup et al. | 320/106 |
| 6,225,783 B1 * | 5/2001 | Nagano et al. | 320/128 |
| 6,229,280 B1 * | 5/2001 | Sakoh et al. | 320/106 |
| 7,238,443 B2 | 7/2007 | Sakakibara | |
| 2001/0017531 A1 | 8/2001 | Sakakibara et al. | |
| 2005/0248309 A1 * | 11/2005 | Denning | 320/106 |
| 2006/0087283 A1 * | 4/2006 | Phillips et al. | 320/114 |

FOREIGN PATENT DOCUMENTS

| | | |
|---|---|---|
| DE | 33 40 882 | 6/1985 |
| DE | 42 25 088 | 2/1993 |
| EP | 0 944 153 | 9/1999 |
| EP | 1 128 517 | 8/2001 |
| WO | WO2006/044693 A2 | 4/2006 |

OTHER PUBLICATIONS

Partial European Search Report corresponding to Application No. EP 07 10 9337 dated Sep. 18, 2007.
EPO Office Action for International Application No. 07 109 337.1-2119 dated Mar. 2, 2012.

* cited by examiner

*Primary Examiner* — Yalkew Fantu
(74) *Attorney, Agent, or Firm* — RatnerPrestia

(57) ABSTRACT

A cordless power tool battery pack including an onboard circuit configured to electronically communicate with an associated battery charging system. The onboard circuit communicates information relating to the batter pack to a microprocessor or the like within the battery charging system and charging of the battery pack is controlled based on such communication.

19 Claims, 11 Drawing Sheets

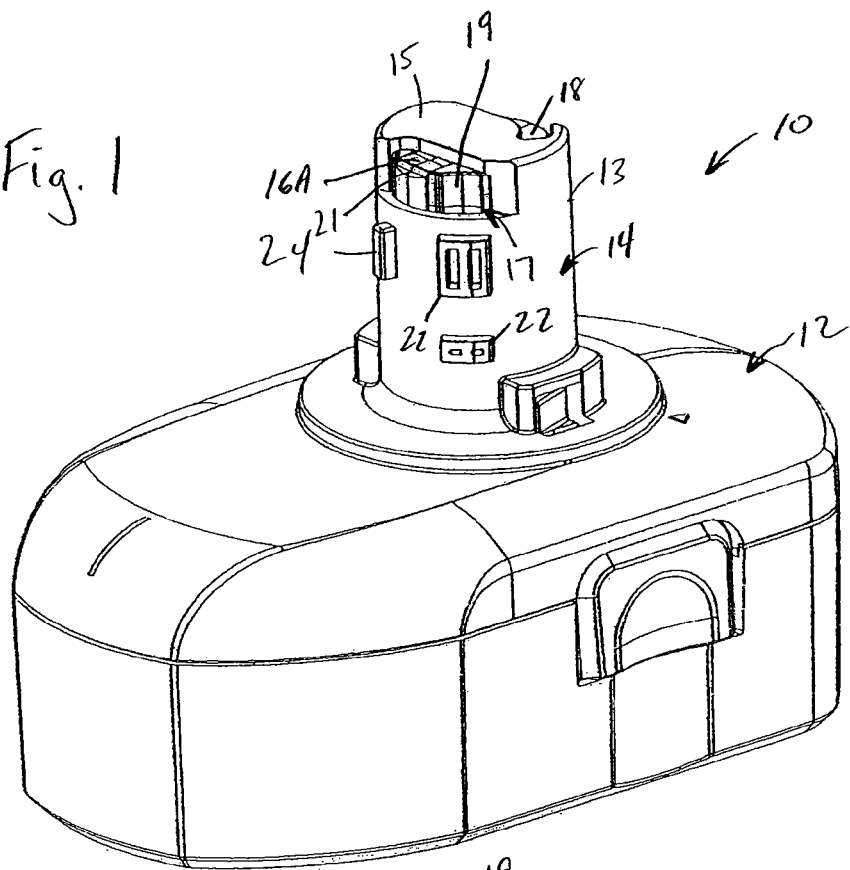
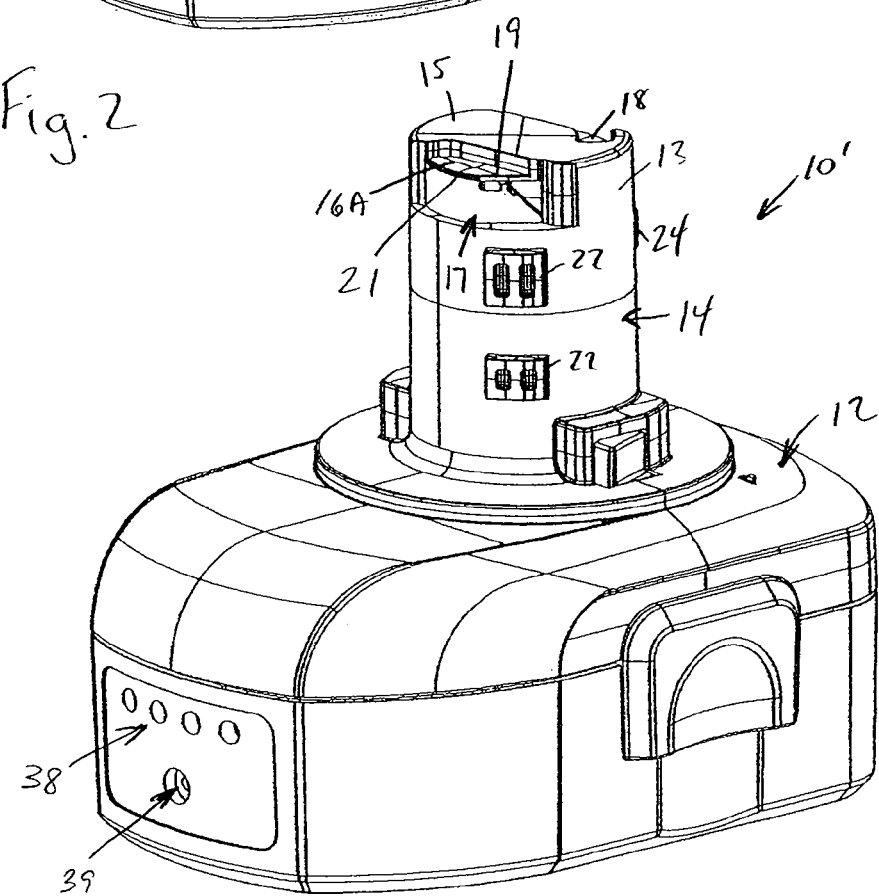

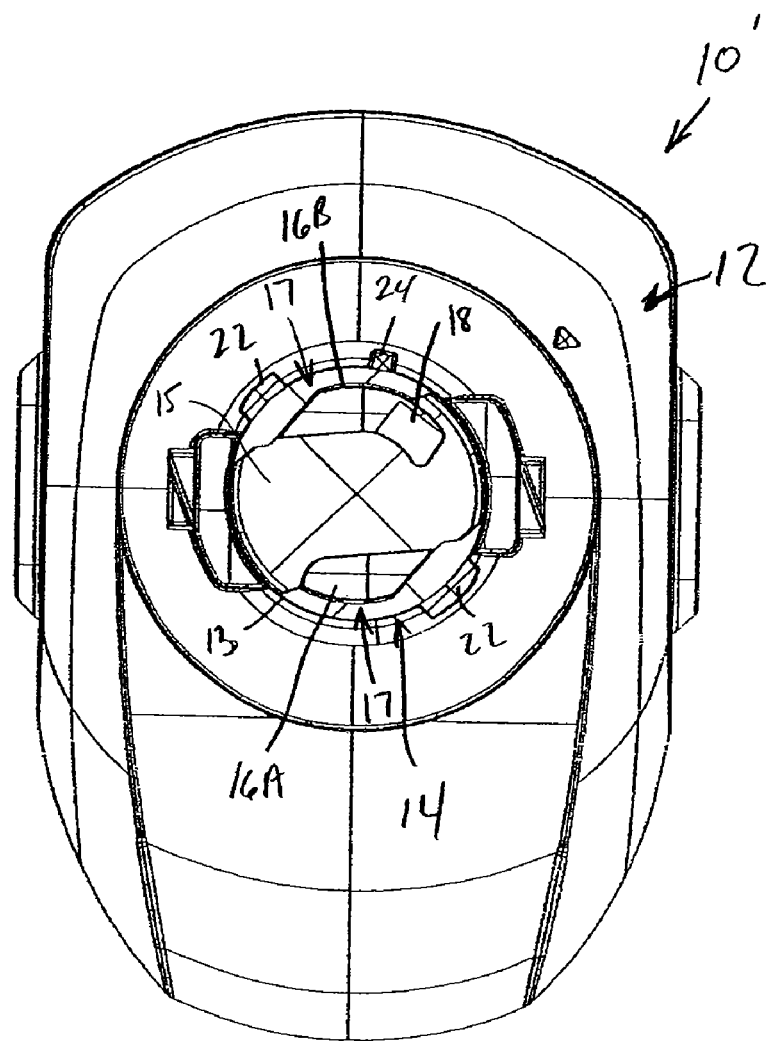

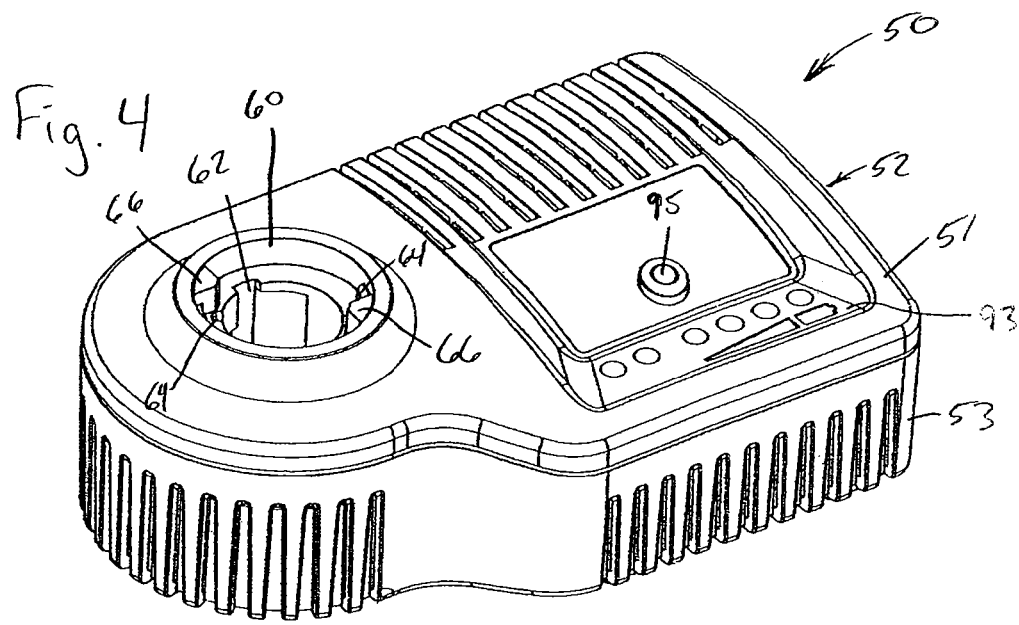
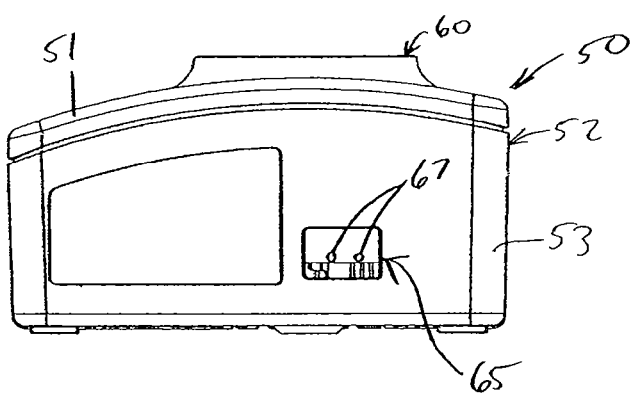

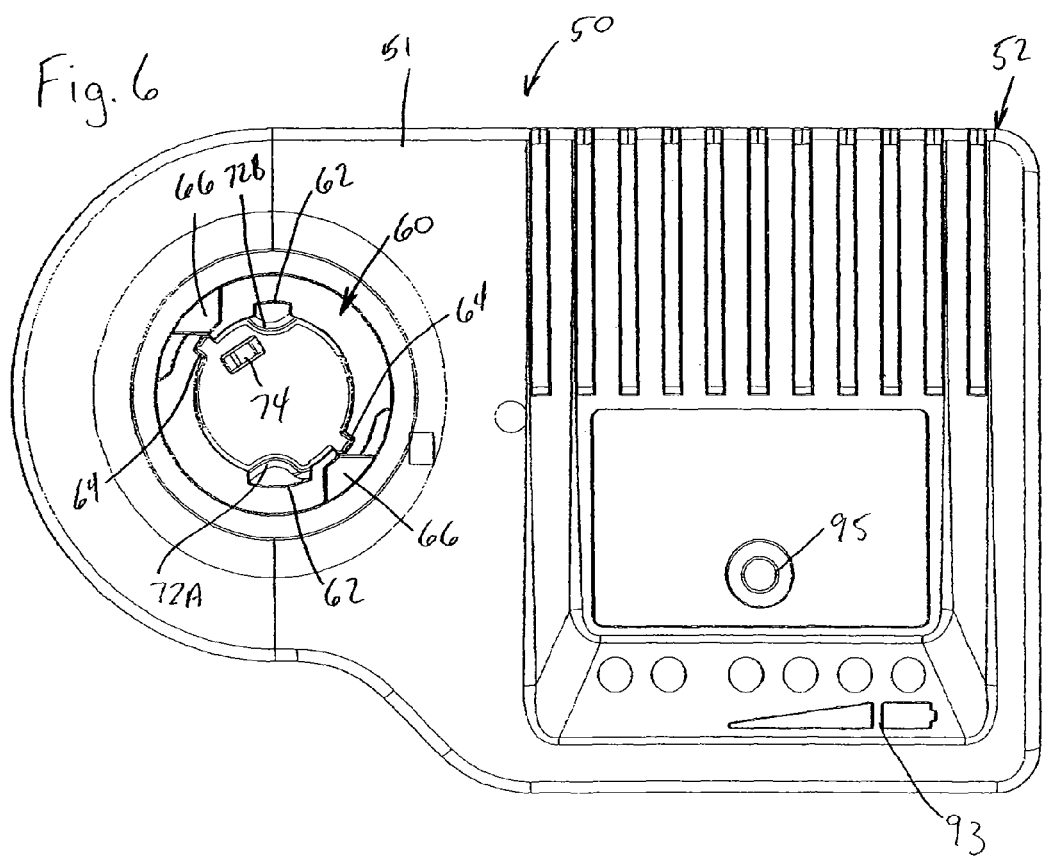

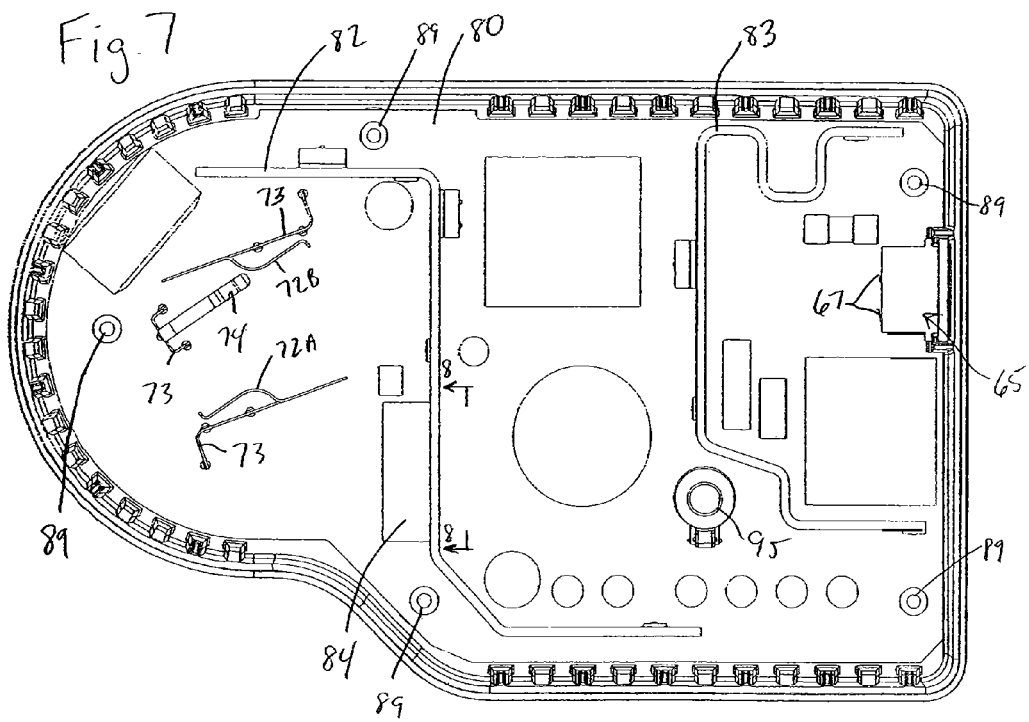
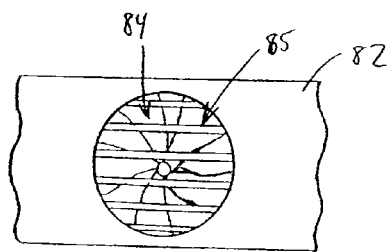

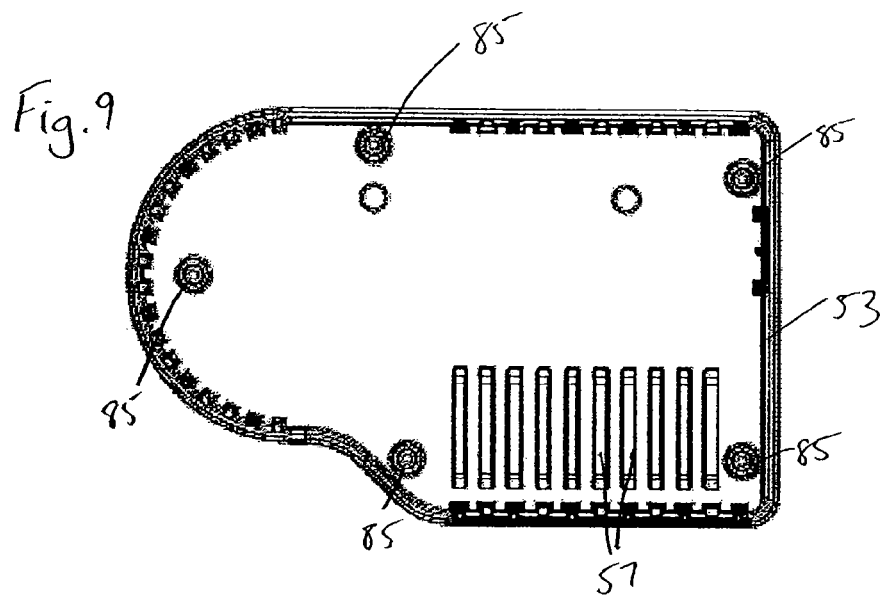
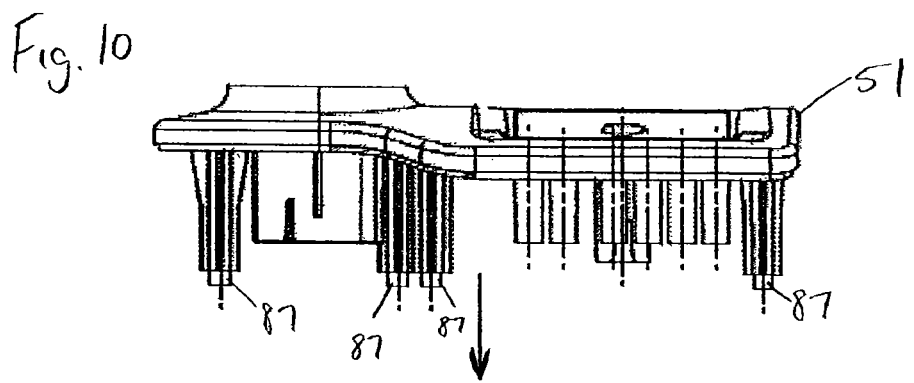
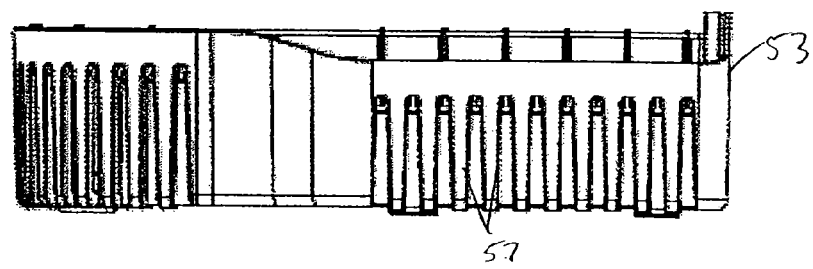

CORDLESS POWER TOOL BATTERY AND CHARGING SYSTEM THEREFORE

CROSS REFERENCE TO RELATED APPLICATIONS

This application is a continuation application of U.S. Ser. No. 11/755,372, filed May 30, 2007, which claims priority to provisional application, U.S. Ser. No. 60/809,955, filed May 31, 2006, the contents of such applications being incorporated herein by reference.

BACKGROUND OF THE INVENTION

The present invention relates to cordless power tools, and more particularly, to batteries for cordless power tools and a charging system for charging such batteries.

Cordless power tools are well-known and provide several advantages over traditional corded power tools. One of the advantages provided by cordless power tools is the mobility and/or portability when using the tool. For example, the operator of the cordless power tool can quickly and efficiently work over a larger area without having to continually adjust the power cord. Similarly, cordless power tools can be used in areas where electrical power is not available. Because of these advantages, the popularity of cordless power tools has increased among both professional and novice power tool users.

It is desired to provide improved cordless power tool batteries and an improved charging system for such batteries.

SUMMARY OF THE INVENTION

In one aspect, the invention may provide a cordless power tool battery including an onboard circuit configured to electronically communicate with an associated battery charging system. In one or more embodiments of the invention, the onboard circuit may contain identifying indicia relating to the battery chemistry, the battery voltage, the battery capacity and the like. In one or more embodiments of the invention, the onboard circuit may contain a charging protocol specific to the battery. In one or more embodiments of the invention, the onboard circuit may be configured to store data related to the battery, for example, a counter of the number of charges, a history of discharge and charge cycles, a history of battery renewing and the like. In one or more embodiments of the invention, the onboard circuit may be configured to communicate with the charging system even if the battery has no voltage.

In another aspect, the invention may provide a cordless power tool battery charging system. In one or more embodiments of the invention, the charging system may be configured to accept multiple input voltages. In one or more embodiments of the invention, the charging system may be configured to charge batteries having different battery chemistries. In one or more embodiments of the invention, the charging system may be configured to charge batteries having different voltages. In one or more embodiments of the invention, the charging system may be configured to charge batteries in accordance with a charging protocol stored in the battery. In one or more embodiments of the invention, the charging system may be configured to display the current charge level of a battery. In one or more embodiments of the invention, the charging system may be configured to compare a current capacity of a battery to an original capacity of a battery and, based thereon, recommend whether the battery should be renewed. In one or more embodiments of the invention, the charging system may be configured to renew a battery by deep discharging the battery and then recharging the battery.

In another aspect, the invention may provide a cordless power tool battery charging system configured to receive batteries having different housing configurations. In one or more embodiments of the invention, the charging system may include keyways configured to receive various battery key patterns. In one or more embodiments of the invention, the charging system may be configured such that the battery contacts and charging system contacts are disengaged prior to removal of the battery from the charging system. In one or more embodiments of the invention, the batteries may include an onboard circuit contact on a distal end surface thereof for contact with a corresponding contact in the charging system. In one or more embodiments of the invention, the charging system may include flexible battery contacts such that the battery contacts within the charging system housing. In one or more embodiments of the invention, the charging system may include a patterned heat sink extending therein. In one or more embodiments of the invention, the charging system may include a fan mounted on a heat sink and wherein the heat sink may further include through passages aligned with the fan.

BRIEF DESCRIPTION OF THE DRAWINGS

FIG. 1 is a perspective view of an exemplary Nickel Cadmium battery in accordance with a first embodiment of the present invention.

FIG. 2 is a perspective view of an exemplary Lithium Ion battery in accordance with an alternate embodiment of the present invention.

FIG. 3 is a top plan view of the battery of FIG. 2.

FIG. 4 is a perspective view of a charging system in accordance with the present invention.

FIG. 5 is a side elevation view of the charging system of FIG. 4.

FIG. 6 is a top plan view of the charging system of FIG. 4.

FIG. 7 is a top plan view similar to FIG. 6 illustrating the charging system of FIG. 4 with the housing top cover removed.

FIG. 8 is a elevational view along the line 8-8 of FIG. 7.

FIG. 9 is a top plan view of the charging system housing bottom cover.

FIG. 10 is an elevation view illustrating the placement of the charging system housing top cover relative to the housing bottom cover.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 11:
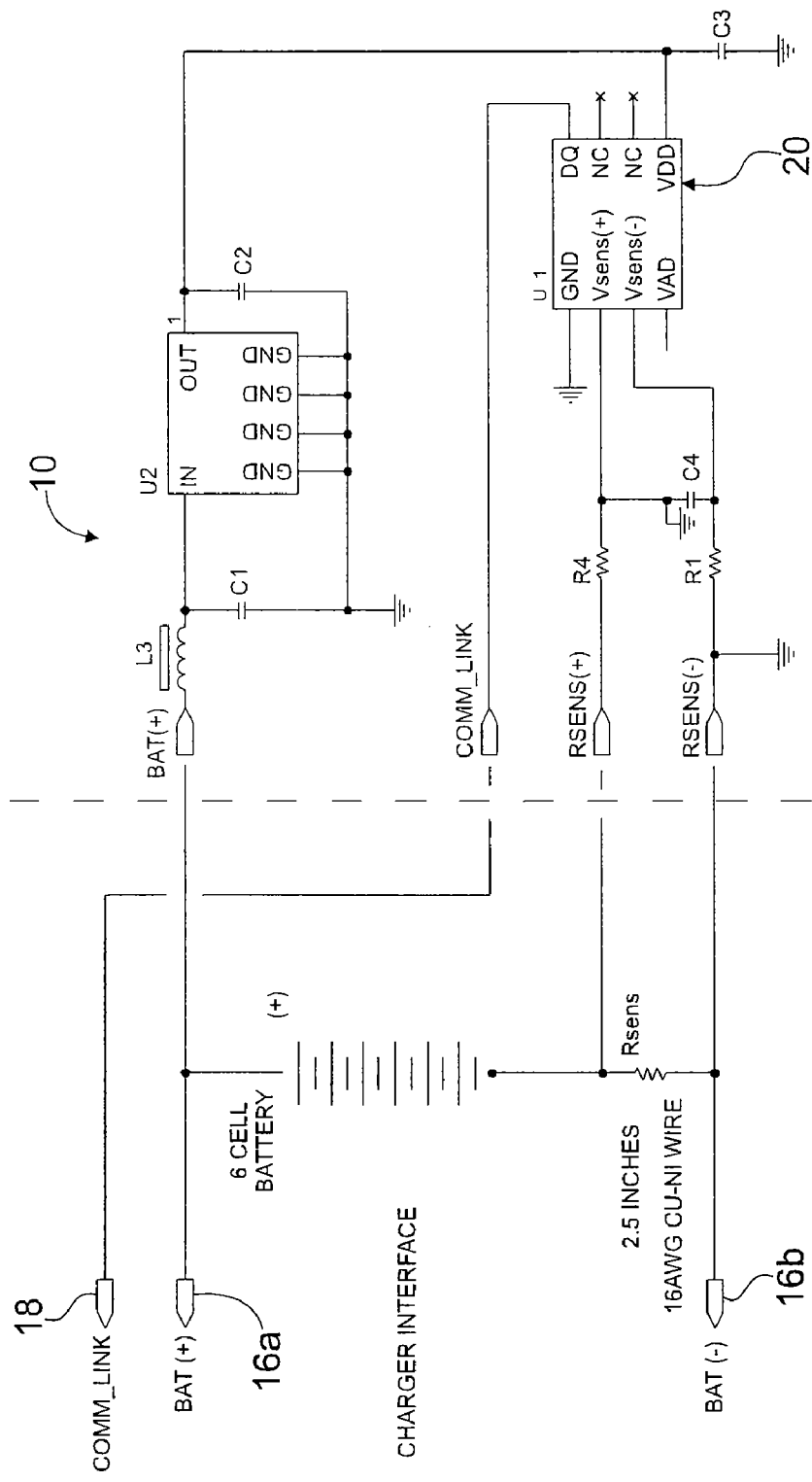
FIG. 11 is an exemplary circuit diagram of the battery of FIG. 1.
Figure 12:
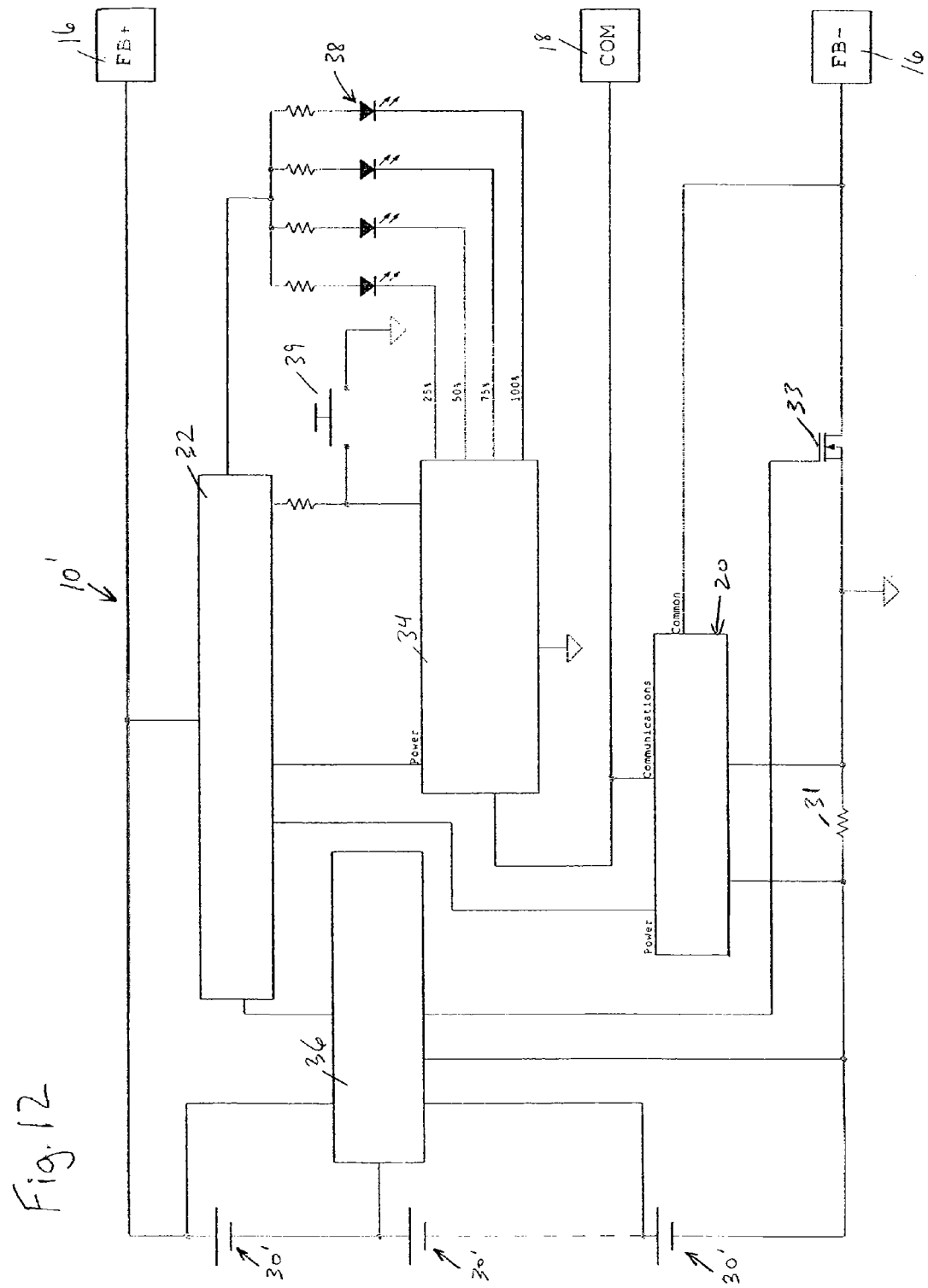
FIG. 12 is an exemplary circuit diagram of the battery of FIG. 2.

Referring to FIGS. 1-3, two exemplary battery packs 10, 10' of the present invention are shown. The battery pack 10 illustrated in FIG. 1 utilizes Nickel Cadmium battery cells while the battery pack 10' illustrated in FIGS. 2 and 3 utilizes Lithium Ion battery cells. Exemplary circuit diagrams for both battery packs 10 and 10' are illustrated in FIGS. 11 and 12, respectively.

Each battery pack 10, 10' includes a main housing 12 with a stem portion 14 extending therefrom. The main housing 12 and the stem portion 14 house the battery cells (not shown). The stem portion 14 preferably houses one or more of the battery cells. In each of the illustrated embodiments, the stem portion 14 has a cylindrical body 13 extending from the main housing 12 to an end cap 15. A pair of opposed openings 17 are provided in the body 13 adjacent to the end cap 15. The number and position of the openings 17 may be varied. The openings 17 are configured to expose the battery electrical contacts 16A and 16B which are electrically interconnected with the battery cells and the battery communication contact 18 which is electrically interconnected with the battery onboard circuit 20.

Referring to FIGS. 1-3, each battery pack 10 and 10' includes various support keys 22 and alignment keys 24 extending radially outward from the stem portion body 13. The support keys 22 are configured to align with and rotatably engage support keyways in various portable tools. The support keys 22 and the alignment keys 24 can be arranged in various configurations, including different widths, heights, positions, numbers and the like. In the preferred embodiment, the configuration of the support keys 22 and alignment key 24 are configured such that the battery pack 10, 10' is properly aligned with the power tool or charging system 50, as will be described hereinafter, such that the proper polarity of the contacts 16A and 16B is maintained.

In the preferred embodiment, each specific support key 22 and alignment key 24 configuration corresponds to a battery pack 10, 10' having a specific voltage such that the battery pack 10, 10' is useable only in power tools requiring such voltage and having corresponding keyways to receive the battery pack 10, 10'. Since the configuration of the keys 22 and the alignment keyway 24 are distinct for each voltage, the different voltage battery packs would not be capable of inadvertent use with the wrong tool.

Referring to FIGS. 4-10, a preferred embodiment of the charging system 50 will be described. The charging system 50 generally includes a housing 52 comprising a top cover 51 and a bottom cover 53. A battery stem receiving opening 60 is defined through the top cover 51. The opening 60 includes one or more support key keyways 62 and one or more alignment key keyways 64. The keyways 62 and 64 are configured to receive various configurations of battery pack support keys 22 and alignment keys 24, such that the charging system 50 provides a universal charger for various battery voltages. For example, the support key keyways 62 are typically wider than most, if not all of the support keys 22, such that, relative to other voltage key configurations, the keys 22 can be moved circumferentially and still align with the keyways 62. Stops 66 are preferably provided within the opening 60 such that the battery pack stem 14 can only be rotated a given amount within the opening 60.

To further facilitate universal usage of the charging system 50, the charging system 50 preferably includes a plug port 65 with male pins 67 configured to mate with the female plug of cords (not shown) useable with different input voltages. As illustrated in the circuit diagrams, the male pins 67 are associated with a voltage converter which allows the charging system to be utilized with different input voltages.

Referring to FIGS. 6 and 7, the charging system 50 includes a pair of opposed electrical contacts 72A and 72B configured to electrically connect with the battery pack contacts 16A and 16B. Again, the configuration of the support keys 22 and alignment key 24 and the keyways 62 and 64 are configured such that the battery pack 10, 10' is properly aligned with the charging system 50 such that the proper polarity of the contacts 16A and 16B is maintained.

Each electrical contact 16A, 16B preferably includes a radially tapered portion 19 extending to an arcuate portion 21. The tapered portions 19 are configured to first contact the charger contacts 72A and 72B during rotation of the battery pack 10, 10' relative to the charging system 50 such that the charger contacts 72A, 72B ride along the tapered portions 19 and into final engagement with the arcuate portion 21. The tapered portion 19 may be made from conductive material, or alternatively, may be a non-conductive material. In the initially inserted position, prior to rotation into electrical contact, the battery pack contacts 16A and 16B are circumferentially offset from and thereby disengaged from the charger contacts 72A and 72B. As such, during axial movement of the battery pack stem 14 into the opening 60, the contacts 16A, 16B and 72A, 72B do not interfere with each other or apply any load upon each other.

A communication contact 74 extends from the circuit board 80 within the charging system 50 and is configured to engage the battery communication contact 18. Electrical connection between the battery communication contact 18 and the communication contact 74 provides a digital link between the onboard circuit 20 in the battery pack 10, 10' and a microprocessor 90 or the like in the charging system 50. An exemplary onboard circuit 20 is the DS2438 manufactured by Dallas Semiconductor, the specifications of which are incorporated herein by reference. The functions of the onboard circuit 20 and the microprocessor 90 will be described hereinafter.

Referring to FIGS. 11 and 12, exemplary circuit diagrams of the batteries 10, 10' of FIGS. 1 and 2, respectively, are shown. Each of the batteries 10, 10' includes a plurality of battery cells 30, 30'. The battery cells 30, 30' are connected with the battery contacts 16A and 16B and are also connected with the onboard circuit 20. A voltage regulator 32, which shuts down the battery when an over discharge is detected, is preferably provided in the battery circuit. A suitable voltage regulator 32 is a model number LM9036-3.3 available from National Semiconductor. Each battery 10, 10' includes a communication link between the onboard circuit 20 and the battery communication contact 18. In the battery circuit of FIG. 12, a voltage sensor 36 is also provided to prevent over discharging. A suitable voltage sensor 36 is a model number S-8242AAMB6T1GZ available from Seiko Instruments. The battery circuit of FIG. 12 also includes a microprocessor 34 which controls operation of the battery 10'. A suitable microprocessor is a model number UPD78F9212GR available from NEC Electronics. A series of fuel gauge lights 38 are connected to the microprocessor 34 and may be actuated using a push button 39 or the like to show the current fuel level directly on the battery 10'. The battery circuit of FIG. 12 also includes a current sense resistor 31 and a MOFSET switch 33 which facilitates disabling of power in the battery 10'. A suitable MOFSET switch is a model number NP88N03 KDG available from NEC Electronics.

Figure 13:
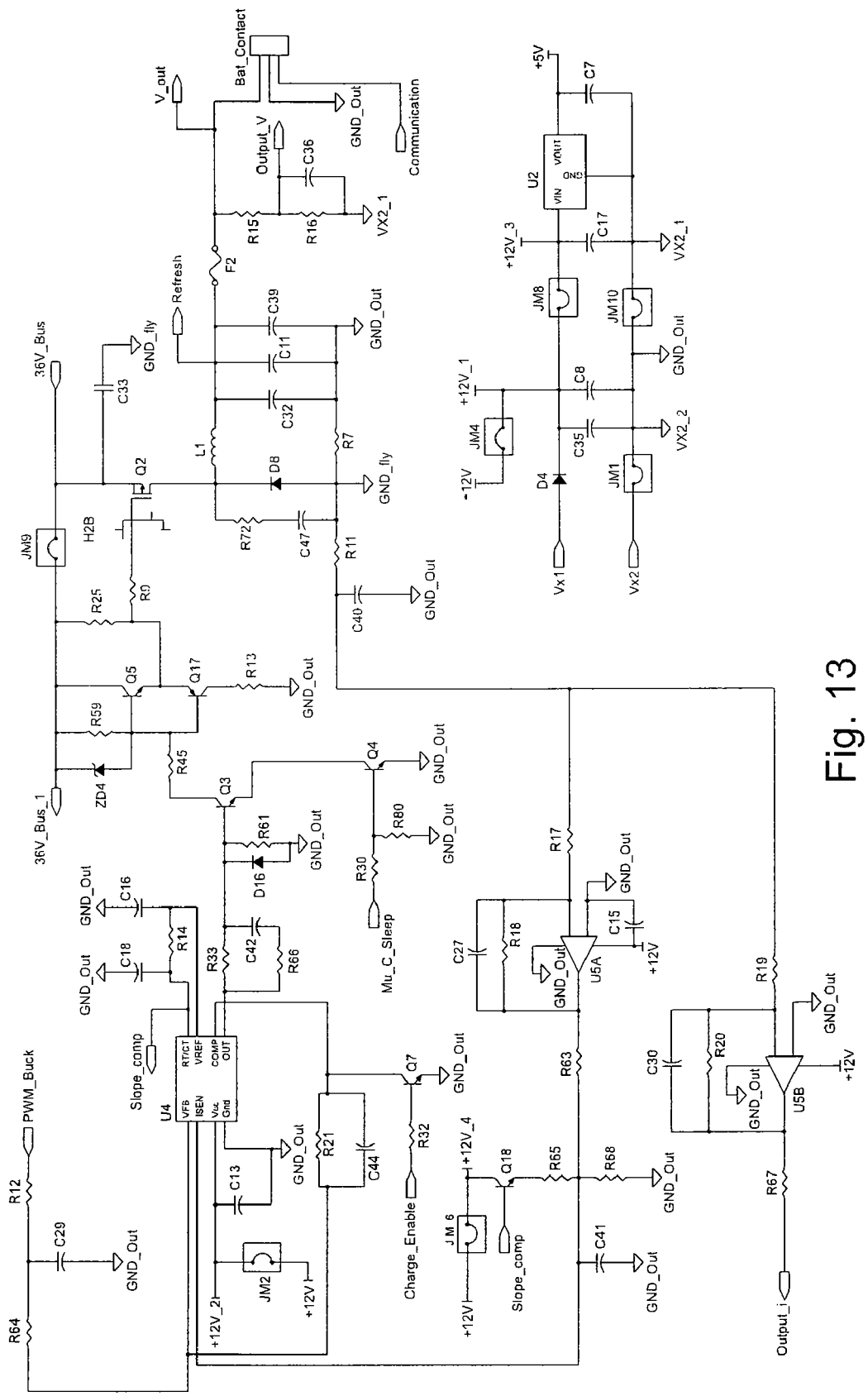
FIG. 13 is an exemplary circuit diagram of a buck circuit of the charging system of FIG. 4.
Figure 14:
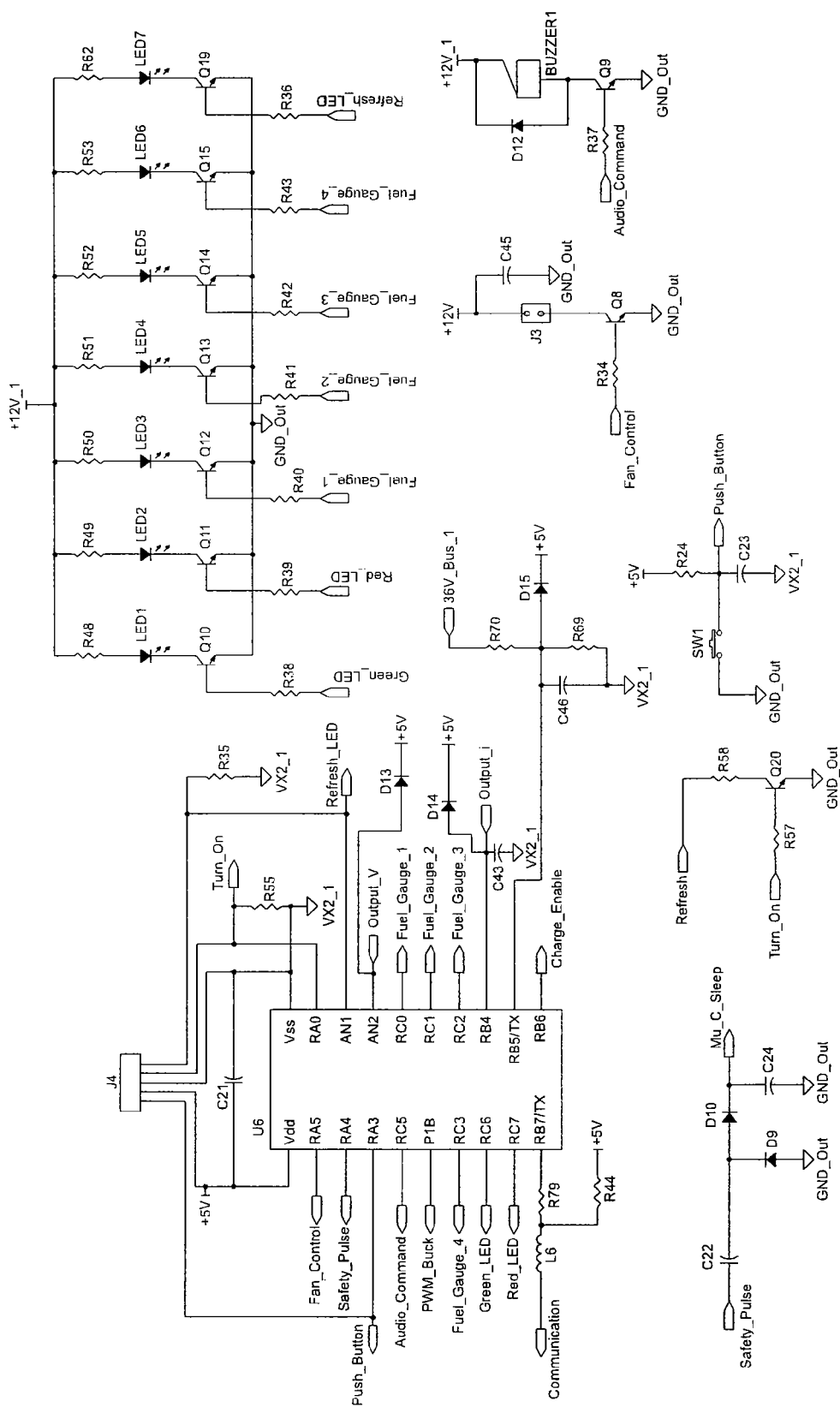
FIG. 14 is an exemplary circuit diagram of a microprocessor and LED circuit of the charging system of FIG. 4.
Figure 15:
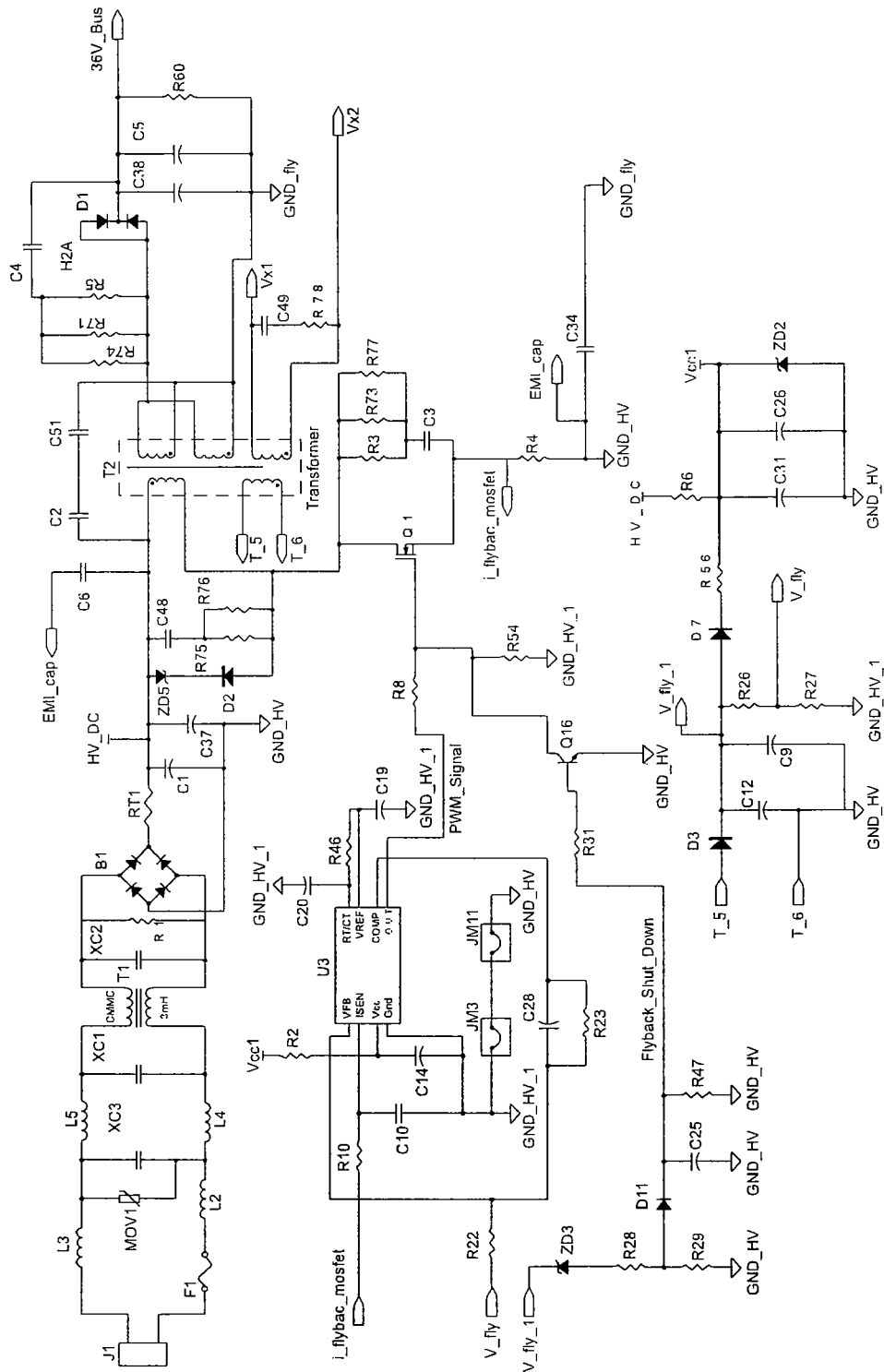
FIG. 15 is an exemplary circuit diagram of a flyback circuit of the charging system of FIG. 4.

Referring to FIG. 7, the various components of the charging system 50 are mounted on a circuit board 80. FIGS. 13-15 are exemplary circuit diagrams of various portions of the charging system 50 and illustrate various components used therein. Mechanical structures are also mounted on the circuit board 80. A pair of heat sinks 82 and 83 are mounted on the board 80 and are configured to remove heat from the electrical components. Each heat sink 82, 83 has a non-linear configuration to maximize the area of heat absorption surface. In the preferred embodiment, to further facilitate cooling, a fan 84 or the like is mounted onto heat sink 82. Referring to FIG. 8, a slotted vent structure 85 may be provided on the heat sink 82 in alignment with the fan 84 to draw or push air across the heat sink 82 to enhance cooling. The housing 52 also has various vent slots 57.

The charger contacts 72A and 72B and the communication contact 74 are each preferably mounted on the circuit board 80 via flexible mounts 73 such that when the top cover 51 is positioned relative to the bottom cover 53, the contacts 72A, 72B and 74 may flex and align with the appropriate areas within the opening 60. Referring to FIGS. 7, 9 and 10, in the preferred embodiment, the circuit board 80 is supported on supports 85 within the bottom cover 53. The circuit board 80 preferably is not initially secured to the bottom cover 53 and is slightly adjustable relative thereto. The top cover 51 is placed onto the bottom cover 53, and feet 87 depending therefrom pass through holes 89 in the circuit board 80 such that the feet 87 engage the supports 85. Screws or the like are utilized to secure the feet 87 to the supports 85 and the circuit board 80 is maintained therebetween. The alignability of the circuit board 80 and the flexibility of the contacts 72A, 72B and 74 allows the charging system 50 to be easily assembled.

The battery onboard circuit 20 and the microprocessor 90 communicate with one another to facilitate various charging functions as herein described. The various components utilized in carrying out these functions are illustrated in the various circuit diagrams in FIGS. 11-15. For example, the onboard circuit 20 preferably contains identifying indicia relating to the battery chemistry (i.e. NiCad vs. Lithium Ion), the battery voltage, the battery capacity and the like. This information is communicated to the microprocessor 90 to inform the charging system 50 the type of battery pack 10, 10' that has been placed in the charging system 50. The exchange of information occurs upon contact between the contacts 18 and 74. The onboard circuit 20 is independent of the stored charge within the battery pack 10, 10' and therefore the battery pack 10, 10' will be recognized by the charging system 50 even if the battery pack 10, 10' is completely drained. In the preferred embodiment, the onboard circuit 20 has stored in its memory a charging protocol specific to the battery pack 10, 10'. In another aspect of the invention, the onboard circuit 20 may be configured to store data related to the battery pack 10, 10', for example, a counter of the number of charges, a history of discharge and charge cycles, a history of battery renewing and the like.

Since the battery onboard circuit 20 provides the microprocessor 90 with specific information relating to the battery pack 10, 10', preferably including the charging protocol, the microprocessor 90 can regulate the voltage output and the like such that the charging system 50 can charge batteries 10, 10' having different battery chemistries or having different voltages. The microprocessor 90 is preferably configured to receive and display the current charge level of the battery pack 10, 10'. In this regard, the charging system 50 includes a charge level indicator 93 which may include a series of LEDs or the like. In the preferred embodiment, the microprocessor 90 is further configured to compare a current capacity of a battery pack 10, 10' to an original capacity of a battery pack 10, 10' (which is preferably stored in the memory of the onboard circuit 20) and, based thereon, recommend whether the battery pack 10, 10' should be renewed. To renew the battery pack 10, 10', a user depresses the renew button 95 to start a renewing cycle. Upon depression of the renew button 95, the microprocessor 90 is configured to initiate a deep discharge of the battery pack 10, 10' and then recharge the battery pack 10, 10'. The discharge button 95 may be configured to light up upon detection of a condition in which a renew is recommend. Alternatively, the microprocessor may be configured to automatically renew the battery pack 10, 10' upon detection of such a condition.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A battery for use with a cordless power tool having a body, the battery comprising:
    at least one battery cell positioned in a battery housing, the battery housing removably engaged with the body of the cordless power tool, the battery housing including support keys and alignment keys extending radially outward from a stem portion and defining one of a plurality of key configurations that engage with the body of the cordless power tool, wherein the key configuration is distinct for each of different battery voltages; and
    an onboard circuit that electronically communicates with an associated battery charging system.

2. A cordless power tool battery according to claim 1 wherein the onboard circuit stores identifying indicia of the battery.

3. A cordless power tool battery according to claim 2 wherein the identifying indicia relates to a chemistry of the at least one battery cell, a voltage of the battery, a capacity of the battery or a combination thereof.

4. A cordless power tool battery according to claim 2 wherein the identifying indicia is stored in a permanent memory.

5. A cordless power tool battery according to claim 1 wherein the onboard circuit stores a charging protocol specific to the battery.

6. A cordless power tool battery according to claim 1 wherein the onboard circuit is configured to store data related to the battery.

7. A cordless power tool battery according to claim 6 wherein the stored data includes a counter of the number of charges, a history of discharge and charge cycles, a history of battery renewing, or a combination thereof.

8. A charging system for use with a removable battery of a cordless power tool having a body, the charging system comprising:
    a charger housing having a battery receiving opening, the battery receiving opening including at least one keyway to receive at least two distinct key configurations of the battery, the battery key configurations removably engage with the body of the cordless power tool; and
    a charging circuit configured to charge the removable battery when engaged within the battery receiving opening, the charging circuit configured to charge in accordance with various charging protocols in dependence on the battery engaged within the battery receiving opening based on said distinct key configuration.

9. A cordless power tool battery charging system according to claim 8 further comprising a voltage converter such that the charging system is configured for connection to at least two different input voltage sources.

10. A cordless power tool battery charging system according to claim 8 wherein the charging protocol is based on the battery chemistry, the battery voltage, or a combination thereof.

11. A cordless power tool battery charging system according to claim 8 wherein the charging system is configured to charge the battery in accordance with a charging protocol stored in the battery.

12. A cordless power tool battery charging system according to claim 8 wherein the charging system is configured to display a present charge level of an engaged battery.

13. A cordless power tool battery charging system according to claim 8 wherein the charging system is configured to compare a current capacity of an engaged battery to an original capacity of the battery and, based thereon, recommend whether the battery should be renewed.

14. A cordless power tool battery charging system according to claim 8 wherein the charging system is configured to renew the engaged battery by deep discharging the battery and then recharging the battery.

15. A cordless power tool battery charging system according to claim 14 wherein the charging system is configured to automatically renew an engaged battery upon detection of a renew condition wherein a current capacity of the engaged battery is below a predetermined threshold compared to an original capacity of the battery.

16. A cordless power tool battery charging system according to claim 8 wherein the battery receiving opening is configured to receive batteries having different housing configurations.

17. A cordless power tool battery charging system according to claim 8 wherein the battery receiving opening has at least one charging system contact therein such that:
   i) when the opening fully receives the battery within the battery receiving opening in a first orientation the battery does not contact the at least one charging system contact and
   ii) after a rotational motion about a stem portion of the battery housing to a secondary orientation, a battery contact engages with the corresponding charging system contact.

18. A cordless power tool battery charging system according to claim 8 further comprising a patterned heat sink extending about a portion of the charging circuit.

19. A cordless power tool battery charging system according to claim 18 wherein a fan is mounted on the heat sink and the heat sink includes through passages aligned with the fan.

* * * * *

UNITED STATES PATENT AND TRADEMARK OFFICE
CERTIFICATE OF CORRECTION

| | | |
|---|---|---|
| PATENT NO. | : 8,299,749 B2 | Page 1 of 1 |
| APPLICATION NO. | : 12/980679 | |
| DATED | : October 30, 2012 | |
| INVENTOR(S) | : Daniel Jay Becker et al. | |

It is certified that error appears in the above-identified patent and that said Letters Patent is hereby corrected as shown below:

Title Page, Item (57) ABSTRACT, line 4 delete "batter" and insert --battery--.

Signed and Sealed this
Nineteenth Day of March, 2013

Teresa Stanek Rea
*Acting Director of the United States Patent and Trademark Office*